United States Patent [19]

Griscom

[11] Patent Number: 5,012,080

[45] Date of Patent: Apr. 30, 1991

[54] DIRECTIONAL PARTICLE FILTER

[76] Inventor: Daniel T. Griscom, 90 Wallace St., #2, Somerville, Mass. 02144

[21] Appl. No.: 511,107

[22] Filed: Apr. 19, 1990

[51] Int. Cl.[5] .......................................... G02B 5/22

[52] U.S. Cl. .............................. 250/505.1; 250/515.1; 250/496.1; 250/492.1; 250/498.1; 350/276 R; 350/276 SL; 350/319; 350/354; 350/407

[58] Field of Search ............... 250/505.1, 515.1, 496.1, 250/497.1, 498.1, 493.1; 350/276 R, 276 SL, 319, 354, 407

[56] References Cited

U.S. PATENT DOCUMENTS

| | | | |
|---|---|---|---|
| 1,800,044 | 4/1931 | Baird . | |
| 2,439,295 | 4/1948 | Hammond et al. | 177/311 |
| 3,411,007 | 11/1968 | Thompson | 250/219 |
| 3,435,246 | 3/1969 | Webb | 250/237 |
| 3,706,494 | 12/1972 | Gardner | 356/28 |
| 3,741,631 | 6/1973 | Laing | 350/267 |
| 3,768,911 | 10/1973 | Erickson | 356/169 |
| 4,176,276 | 11/1979 | Kaul et al. | 250/237 |

*Primary Examiner*—Jack I. Berman
*Attorney, Agent, or Firm*—Fish & Richardson

[57] ABSTRACT

The invention features a directional particle filter for selectively blocking specific particles whose projected paths intersect a predetermined point relative to the filter. This filter includes a plurality of non-intersecting surfaces arranged in layers, each surface including multiple units, combinations of the units forming passing and blocking tuples, or ordered sets of units. Each tuple includes one unit from each surface. The blocking and passing tuples are arranged so that the projected path of each specific particle through the filter that intersects the predetermined point traverses a blocking tuple and the projected paths of specific particles through the filter that do not intersect the predetermined point traverse both passing and blocking tuples. Methods of selectively blocking specific particles and constructing a directional particle filter are also featured.

29 Claims, 13 Drawing Sheets

DIRECTIONAL PARTICLE FILTER

BACKGROUND OF THE INVENTION

This invention relates to filters designed to select various particles based on the particles' direction of approach.

Many filters have been designed to select particles based on energy, composition, color or polarization. However, the repertoire of filters that employ directional selection has been quite limited. One class of directional filter allows only those particles traveling at or near a given direction to pass through; all others are absorbed. Other directional filters limit passage to those particles approaching within a specific plane. Other less precise filters limit reception to a region of a hemisphere.

Few techniques presently exist that block particles coming from a single undesirable source while allowing particles from the rest of the environment to pass. One of the few practical methods is the ancient art of holding up an object to block the sun (e.g., a parasol or one's hand). This method, holding an opaque barrier at a distance to intercept undesirable particles incident upon a small detector, has severe limitations. First, its effects are limited to a small area, e.g., a single finger can't shield both eyes. Second, the barrier must be held far enough away from the detector to avoid blocking desirable particles. The net result of these limitations is that the barrier must be larger than the protected area and must be held at a distance equal to the size of the barrier divided by the tangent of the desired angular blocking width. This makes the method unwieldy and imprecise.

Other versions of this method exist. Some sunglasses have dark areas above and below a relatively more transparent horizon area, protecting the wearer against glare from the sky and the ground, while allowing much of the light from the horizon (which generally contains the object of attention) to pass through to the wearer's eyes. Many hats have rims or visors designed to block the sky, and thus the sun, from the wearer's eyes. Many automobiles have tinted windshields, a region at the top being darkened to limit the sunlight striking the driver's eyes, and most have movable opaque visors which can be hand-adjusted to block the setting or rising sun. Venetian blinds can be adjusted to block progressively more light as a light source's angle above the horizon increases. Each of these solutions is either unwieldy or indiscriminate, and none offers a truly satisfactory answer to the problems posed by particle sources which, while limited in size, are nonetheless bothersome because of their intensity.

SUMMARY OF THE INVENTION

In general, the invention features a directional particle filter for selectively blocking specific particles whose projected paths intersect a predetermined point relative to the filter. This filter includes a plurality of non-intersecting surfaces arranged in layers, each surface including multiple units, combinations of the units forming passing and blocking tuples, each tuple comprising one unit from each of said surfaces such that the projected path of any specific particle through the filter traverses a single tuple. The blocking and passing tuples are arranged so that the projected path of each specific particle through the filter that intersects the predetermined point relative to the filter traverses a blocking tuple, and the projected paths of specific particles through the filter that do not intersect said predetermined point traverse passing and blocking tuples; the units are further arranged so that no specific particle deflected by the units passes through the filter.

Particles, as that term is used herein, are small objects that travel in straight lines and can be passed or absorbed by suitable materials. Examples include nuclear particles, photons or electromagnetic waves (a wave can be treated as a particle if its wavelengths is short enough to avoid diffraction) and phonons or sound waves.

Specific particles, as that phrase is used herein, are particles of a particular type or range within a broader category of particles. For example, within the category of electromagnetic particles, the specific particles selectively blocked by the filter may be all those particles in the range of x-rays or visible light or in the narrower range of a particular color of visible light.

A unit, as that term is used herein, is an area of a surface. A unit is characterized by its effect on incident particles of the specific type selectively blocked by the filter. For example, the surfaces of a filter may be composed of transparent and opaque units; the transparent units pass all incident specific particles and the opaque units absorb all incident specific particles.

A tuple, as that term is used herein, is an ordered set of units including exactly one unit from each surface in the filter. For example, in a two surface filter, each tuple includes two units. A given tuple is generated or selected from the existing units in the multiple surfaces by the projected path of a specific particle intersecting the filter; the particle intersects each unit in the tuple, traversing the tuple. A given unit may therefore be included in any number of tuples depending on how many different paths of particles intersect that unit.

There are two types of tuples, blocking and passing, regardless of how many units are in each tuple. Blocking tuples block all the specific particles whose projected paths traverse the tuple. Passing tuples pass some or all particles whose projected paths traverse the tuple. It is the characteristics and order of the units in a tuple that defines whether a tuple is a blocking or a passing tuple. For example, in a two surface filter with opaque and transparent units, tuples with two transparent units are passing tuples, while tuples with one opaque and one transparent unit, or with two opaque units, are blocking tuples. In a three-surface filter with opaque and transparent units a tuple will be a passing tuple only if all three of its component units are transparent.

In preferred embodiments, the units of the filter are transparent or opaque to the specific particles. The filter may include three surfaces, each surface having one-third opaque units and two-thirds transparent units. The filter may selectively block one, two, or more predetermined points. A filter which selectively blocks two predetermined points may include two surfaces, the first of which has one-third transparent units and two-thirds opaque units, and the second of which has four-ninths transparent units and five-ninths opaque units.

In other preferred embodiments, the filter includes two surfaces. In some of these embodiments, the first surface has a first pattern of transparent and opaque units, and the second surface has a second pattern of transparent and opaque units complementary to the first pattern. The first pattern of such a filter may be random and include an equal quantity of transparent and opaque units.

Random, as used herein, includes directions of polarization or patterns that are pseudorandom or merely appear to be random. For example, specific patterns that appear to be random but are carefully designed to enhance the filter's characteristics are included in this definition.

In another preferred embodiment, in which the flux of particles striking the filter from any predetermined point is substantially greater than the flux of all other particles, the second surface of the filter is made of a photochromic material that automatically generates opaque units at all locations struck by particles from any predetermined point and remains transparent at all other locations.

In further preferred embodiments, the filter surfaces may consist of opaque units composed of an opaque material deposited onto each face of a transparent substrate and transparent units composed of areas devoid of any opaque material. The opaque material of such a filter may be ink, and may be created photographically.

In further preferred embodiments, the filter is composed of two surfaces arranged in parallel to each other. In one aspect of this filter, the two surfaces can be translated laterally with respect to one another, whereby the predetermined point also moves in a lateral direction.

In further preferred embodiments, the filter is composed of two surfaces with polarized units. In such a filter, the units of the first surface may have random directions of polarization. Alternatively, the units of the filter may each include a polarizing surface and a liquid crystal cell arranged such that each projected path of a particle to be blocked sequentially intersects the polarizing surface and the liquid crystal cell of a unit in the first surface and the liquid crystal cell and the polarizing surface of a unit in the second surface.

In further preferred embodiments, the filter surfaces are concentric spheres and the predetermined point or points to be blocked are within the concentric spheres. The predetermined points to be blocked may make up a line of points; the units of such a filter would be in the form of bands. In such a filter, the surfaces of the filter may be concentric cylinders and the predetermined points may form a line within these concentric cylinders. In another preferred embodiment, the filter includes three surfaces and is constructed to block particles whose projected paths intersect any of a set of predetermined points.

The invention also features a method of constructing a directional particle filter for selectively blocking specific particles whose projected paths intersect a predetermined point relative to the filter that includes the steps of: generating a first pattern of transparent and opaque units on a first surface; projecting the transparent and opaque units of the first surface onto subsequent surfaces along the projected paths of the particles that intersect the predetermined points, the surfaces being arranged such that they do not intersect, generating subsequent patterns of transparent and opaque units on the subsequent surfaces corresponding to the projections of the units of the first surface, the projection of a transparent unit of the first surface defining an opaque unit of at least one of the subsequent surfaces. In preferred embodiments of this method, the first pattern may be random and include an equal quantity of transparent and opaque units. Two predetermined points may be used to project the transparent and opaque units from the first surface onto the subsequent surfaces. The method may be used to construct a filter including two surfaces arranged in parallel to each other. A two-surface filter with a single predetermined point may be generated by projecting transparent units of the first surface to define opaque units on the second surface and projecting opaque units of the first surface to define transparent units of the second surface.

THE VIEW THROUGH A DIRECTIONAL FILTER

Each predetermined point associated with a filter is known as a blocked point; incident particles whose projected paths intersect a blocked point are blocked by the filter. If the given points form a line then the line is known as a blocked line.

An observer (such as a person, telescope or camera) looking through a one-blocked-point filter sees a fuzzy opaque field (the foreground of the filter) superimposed on the blocked point, surrounded by a more transparent region (the background of the filter). The shape of the foreground is similar to the average shape of the units, e.g., square units produce a square foreground. The passing ratio of a region of the filter is defined to be the ratio of the number of particles passed by that region of the filter to the number of particles incident upon that region of the filter; since in the foreground all particles are blocked, the filter has a foreground passing ratio of 0%. Only the center of the foreground is totally opaque: the passing ratio increases in all directions until it is equal to the background passing ratio. The full width at half maximum of the foreground (the angular width of the area where the passing ratio is less than the average of the foreground passing ratio and the background passing ratio) is equal to the arctangent of the ratio of the average unit size to the inter-surface distance (this value is only well defined for certain filter embodiments). The filter compensates for parallax; as the observer moves, the foreground of the filter also moves to cover the blocked point.

In the background the image is attenuated but undistorted. If the average unit size is similar to or larger than the pupil size of the observer (e.g., the size of a person's pupil or a telescope's objective lens) then a random mottling is visible in the background; if the average unit size is much smaller than the pupil size of the observer then the random mottling is averaged out and the background appears evenly attenuated.

Other features and advantages of the invention will be apparent from the following description of the preferred embodiments and from the claims.

DESCRIPTION OF THE PREFERRED EMBODIMENTS

The drawings are first briefly described.

DRAWINGS

A SIMPLE DIRECTIONAL PARTICLE FILTER WITH TRANSPARENT AND OPAQUE UNITS

Figure 1:
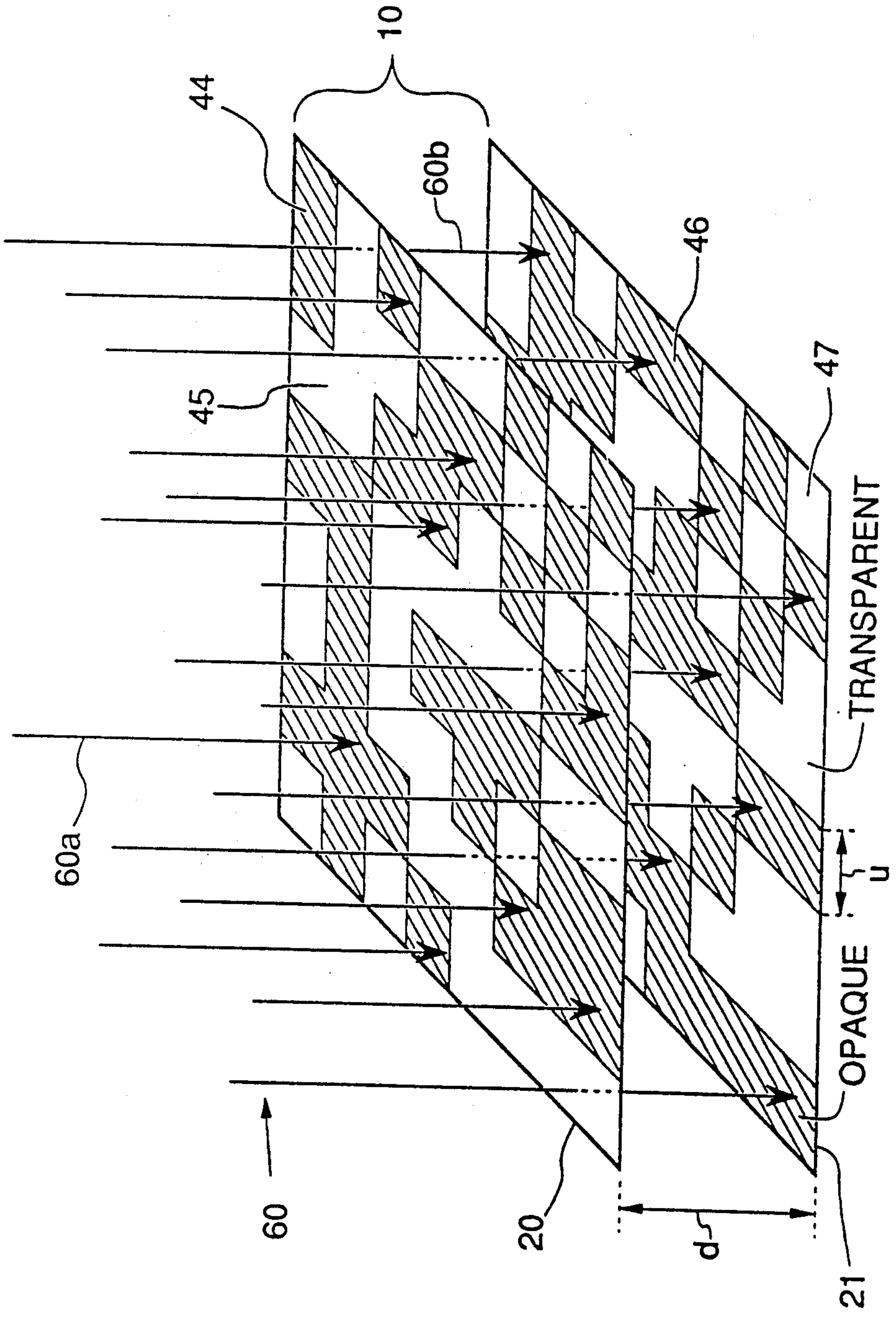
FIG. 1 is a schematic of a simple directional particle filter that includes two spaced parallel planes having opaque and transparent units and designed to block all particles approaching perpendicular to the filter; the schematic shows such particles being blocked.
Figure 2:
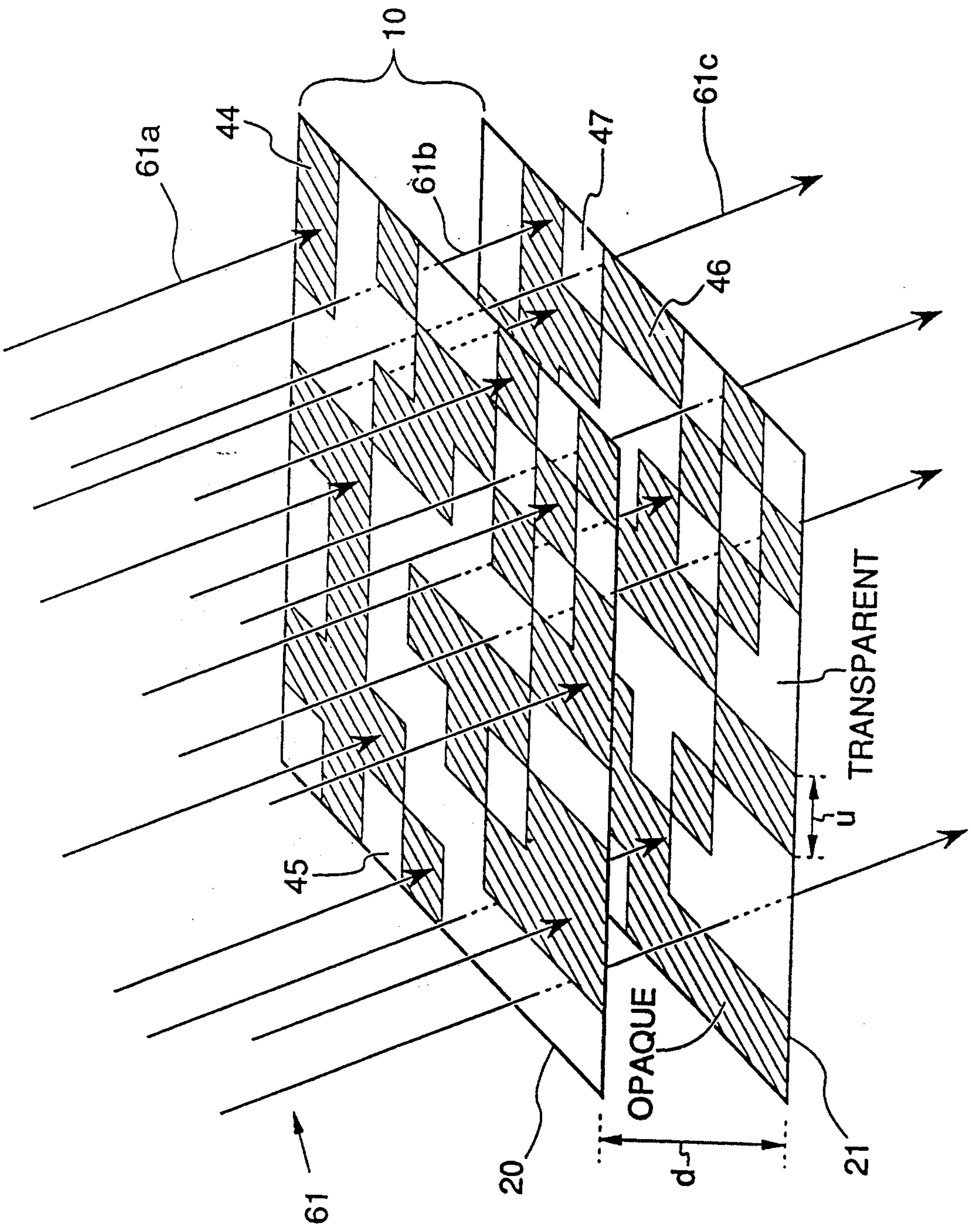
FIG. 2 is a schematic of the same filter shown in FIG. 1, showing the results when particles approach the filter at an angle: 25% of such particles are passed.

FIGS. 1 and 2 show a filter designed to block all particles approaching perpendicular to the filter and to pass a certain proportion of the particles approaching obliquely to the filter. An observer looking through the filter sees the foreground of the filter as an opaque field apparently suspended a great distance in front of the filter. Away from the foreground the view is darkened but undistorted.

The filter 10 includes two plane surfaces 20, 21, each of which is partitioned into equal areas of transparent 45, 47 and opaque 44, 46 units. The units are distributed randomly across each surface but are complements of each other between the surfaces, i.e. if the surfaces 20, 21 were to be placed in contact with each other, the transparent units 45, 47 would match the opaque units 44, 46. The two surfaces 20, 21 are placed parallel to each other with their alignment maintained, at a specified distance d.

FIG. 1 shows particles 60 approaching perpendicular to the filter 10. Half of the particles **60*a* are blocked by the opaque units 44 in the first surface 20, and the other half of the particles 60*b* are passed by the transparent units 45 in the first surface 20 and blocked by the opaque units 46 in the second surface 21. None of such particles 60 pass through; the filter 10** has a foreground passing ratio of 0%.

FIG. 2 shows particles 61 approaching obliquely to the filter 10. Half of the particles **61*a* are blocked by the opaque units 44 in the first surface 20, one quarter of the particles 61*b* are passed by the transparent units 45 in the first surface 20 and blocked by the opaque units 46 in the second surface 21, and one quarter of the particles 61*c* are passed by both the transparent units 45 in the first surface 20 and the transparent units 47 in the second surface 21 and thus pass through the filter 10. Since there are four equal-probability cases, three of which absorb all particles and one of which passes all particles, one out of four of the particles 61 approaching obliquely pass through; the filter 10** has a background passing ratio of 25%.

A TECHNIQUE FOR PRODUCING A DIRECTIONAL FILTER

Figure 3:
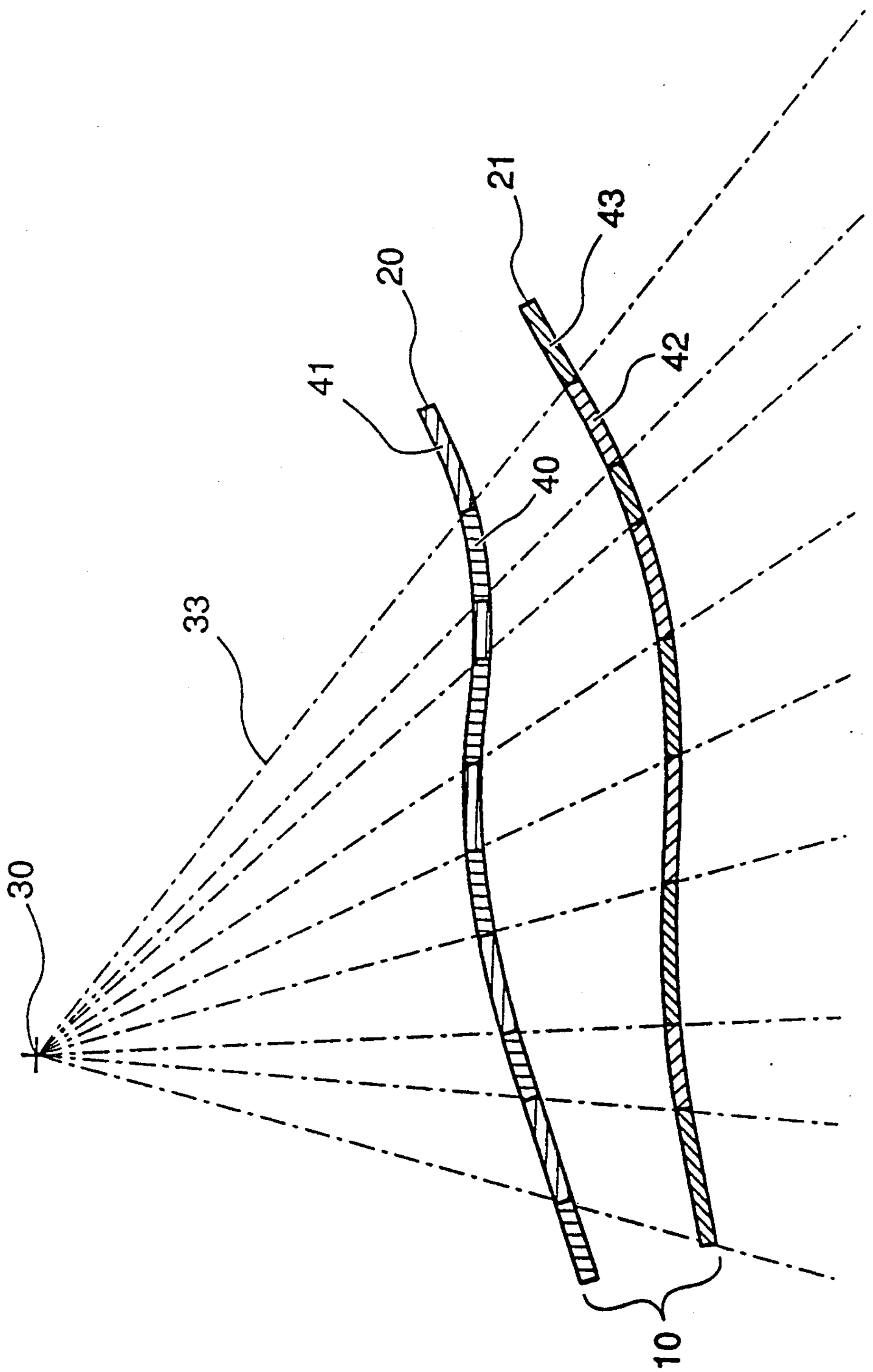
FIG. 3 is a schematic showing the use of projection to establish the arrangement of units on a two-surface, one-blocked-point filter.

One method for producing a filter according to the invention, shown in FIG. 3, employs projection. The schematic shows the method as applied to laying out units on a two-surface, one-blocked-point filter. The filter 10 includes two surfaces 20, 21 and one blocked point 30. The first surface 20 is composed of two types of units 40, 41; the second surface 21 is composed of two types of units 42, 43. The units' composition is such that the tuples composed of units 40 and 42, or 41 and 43, are blocking tuples, while the tuples composed of units 40 and 43, or 41 and 42, are passing tuples. To form the filter 10, the units 40, 41 on the first surface 20 are laid out randomly, with an equal amount by area of each type of unit. Then, projection lines 33 are extended from the blocked point 30 through the units 40, 41 composing the first surface 20 and to the second surface 21. The projected locations of the units 40 and 41 on the first surface 20 determine the locations of the units 42 and 43 on the second surface 21; the second surface 21 must have a unit 42 wherever a unit 40 on the first surface 20 is projected onto the second surface 21, and a unit 43 wherever a unit 41 on the first surface 20 is projected onto the second surface 21.

Figure 4:
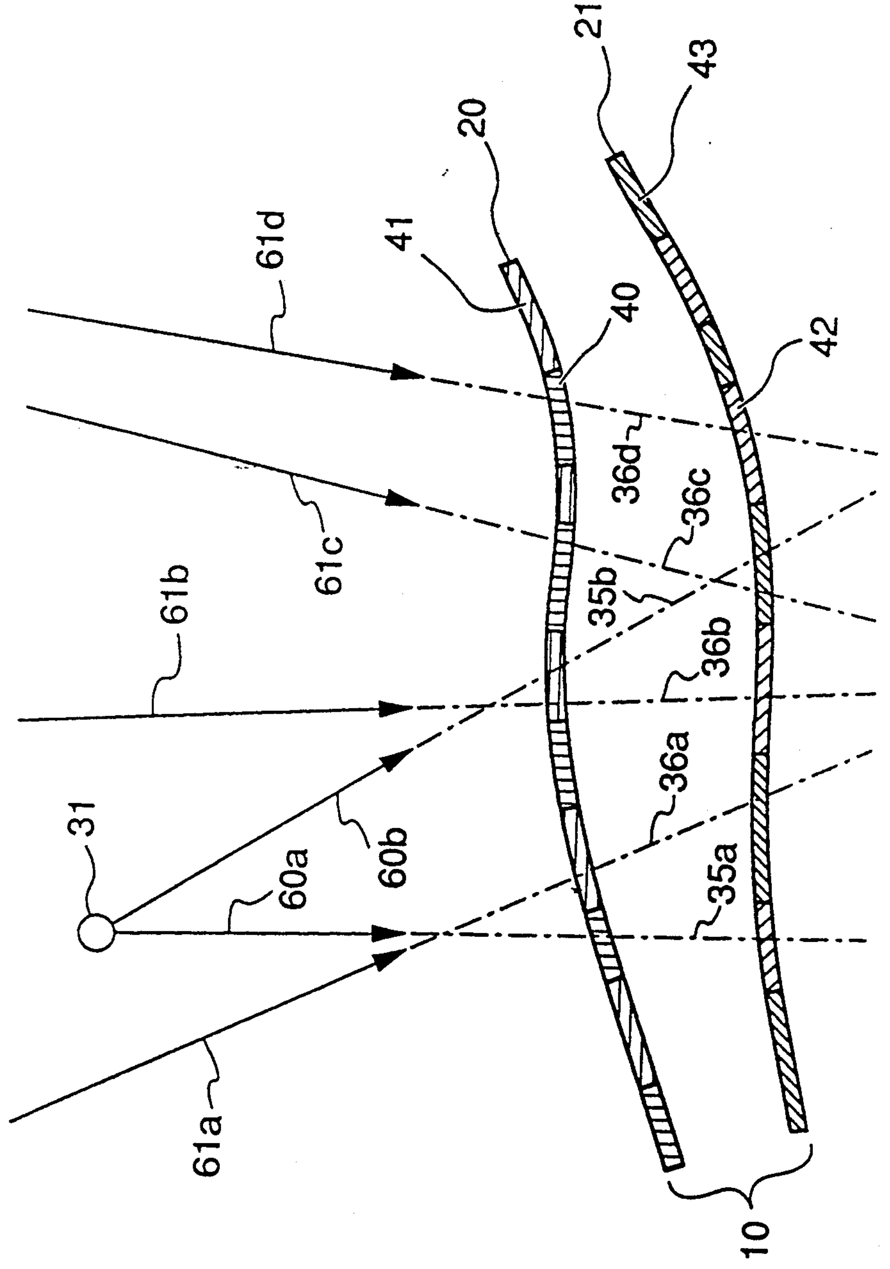
FIG. 4 is a schematic of the same filter shown in FIG. 3, showing the relationship between particles, projected paths and tuples.

FIG. 4 shows the same filter as FIG. 3, with particles approaching the filter from the foreground and the background. Particles **60*a*, 60*b* from the blocked source 31 in the foreground of the filter 10 have projected paths 35*a*, 35*b*. Path 35*a* traverses a blocking tuple composed of units 40 and 42; particle 60*a* will be blocked. Path 35*b* traverses a blocking tuple composed of units 41 and 43; particle 60*b* will be blocked. The projected path 35 of any particle 60 from the blocked source 31 will traverse a blocking tuple; all particles 60 from the blocked source 31** will be blocked.

Particles **61*a*, 61*b*, 61*c*, 61*d* from sources in the background of the filter 10 have projected paths 36*a*, 36*b*, 36*c*, and 36*d*, respectively. Path 36*a* traverses a blocking tuple composed of units 41 and 43; particle 61*a* will be blocked. Path 36*b* traverses a passing tuple composed of units 41 and 42; particle 61*b* may be passed. Path 36*c* traverses a passing tuple composed of units 40 and 43; particle 61*c* may be passed. Path 36*d* traverses a blocking tuple composed of units 40 and 42; particle 61*d* will be blocked. The projected path 36 of any particle 61 from sources in the background of the filter 10 may traverse a blocking or a passing tuple; some particles from the background of the filter 10 will pass undiverted through the filter 10**,

CONTROLLABILITY OF THE FILTER

Many aspects of the filter can be controlled. The location of the foreground can be changed by moving the blocked line or points used to generate the filter. With a filter composed of two parallel planes, this can be as simple as translating one of the two planes in a direction parallel to the planes; the effective blocked points also move parallel to the planes.

The size and shape of the foreground can also be controlled. Changing the average size of the filter's units or the distance between the filter's surfaces changes the angular width of the foreground. In filters employing opaque and transparent units, one can increase the angular width of the completely blocked center of the foreground by enlarging the opaque units at the expense of the transparent units. The shape of the foreground can be changed by modifying the average shape of the units.

The foreground passing ratio in filters constructed by the above method is zero. However, one can increase the foreground passing ratio by randomizing the arrangement of the units on one of the surfaces without changing the arrangement of the other surface. The more random the arrangement is, the higher the passing ratio becomes. At the limit, the arrangement of the units is completely random, the foreground passing ratio is the same as the background passing ratio, and the filter is non-directional, blocking particles from all directions equally.

The background passing ratio can be decreased. Often, each surface of a filter is composed of an equal amount of each of the types of units. However, by biasing each surface more and more towards one type of unit while maintaining the filter design rules, one can decrease the background passing ratio. At the limit, the surfaces are each composed of only one type of unit, every path through the filter selects a blocking tuple, the background passing ratio is equal to the foreground passing ratio, and the filter is completely opaque.

One can ameliorate the background artifacts visible as random mottling by rapidly varying the layout of the units while preserving the inter-surface relationships. This will result in artifacts that also vary rapidly; if the artifacts change faster than the reaction time of the observer then they will be imperceptible. For instance, in a light filter designed for people, varying the layout of the units sixty times a second would eliminate perceivable artifacts.

PERFORMANCE CHARACTERISTICS

The two-surface filter employing opaque and transparent units described above has a background passing ratio of 25%. By examining each of the two-surface, one-blocked-point embodiments below one can see that a 25% background passing ratio is common to all of them. The recurrence of this value is not a coincidence; 25% is the highest possible background passing ratio for a two-surface, one-blocked-point filter according to the invention, given one constraint: the units must do no more than selectively absorb or pass incident particles.

This constraint is satisfied by many types of filters, such as polarizing filters, colored filters or completely opaque filters. For example, in some of the embodiments below, opaque and transparent units are employed. This satisfies the constraint; transparent units pass all incident particles unchanged while opaque units completely block all incident particles. In another embodiment light polarizing surfaces are used. The first surface includes a polarizing surface which only allows light polarized in one axis to pass, followed by a liquid crystal cell which either rotates the polarization of the light or passes it unchanged. In an environment where incident photons are unpolarized the effect of the first surface is equivalent to that of a simple polarizer whose axis of polarization changes from unit to unit. Such a polarizer absorbs photons based on their polarization and thus complies with the constraint. However, if the photons striking the filter of the embodiment are already polarized in the same axis as the polarizing surface then the first surface of the filter modifies the incident photons rather than simply absorbing or passing them; the filter violates the constraint and in fact can have up to a 50% background passing ratio.

A FILTER EMPLOYING THREE SURFACES

Figure 5:
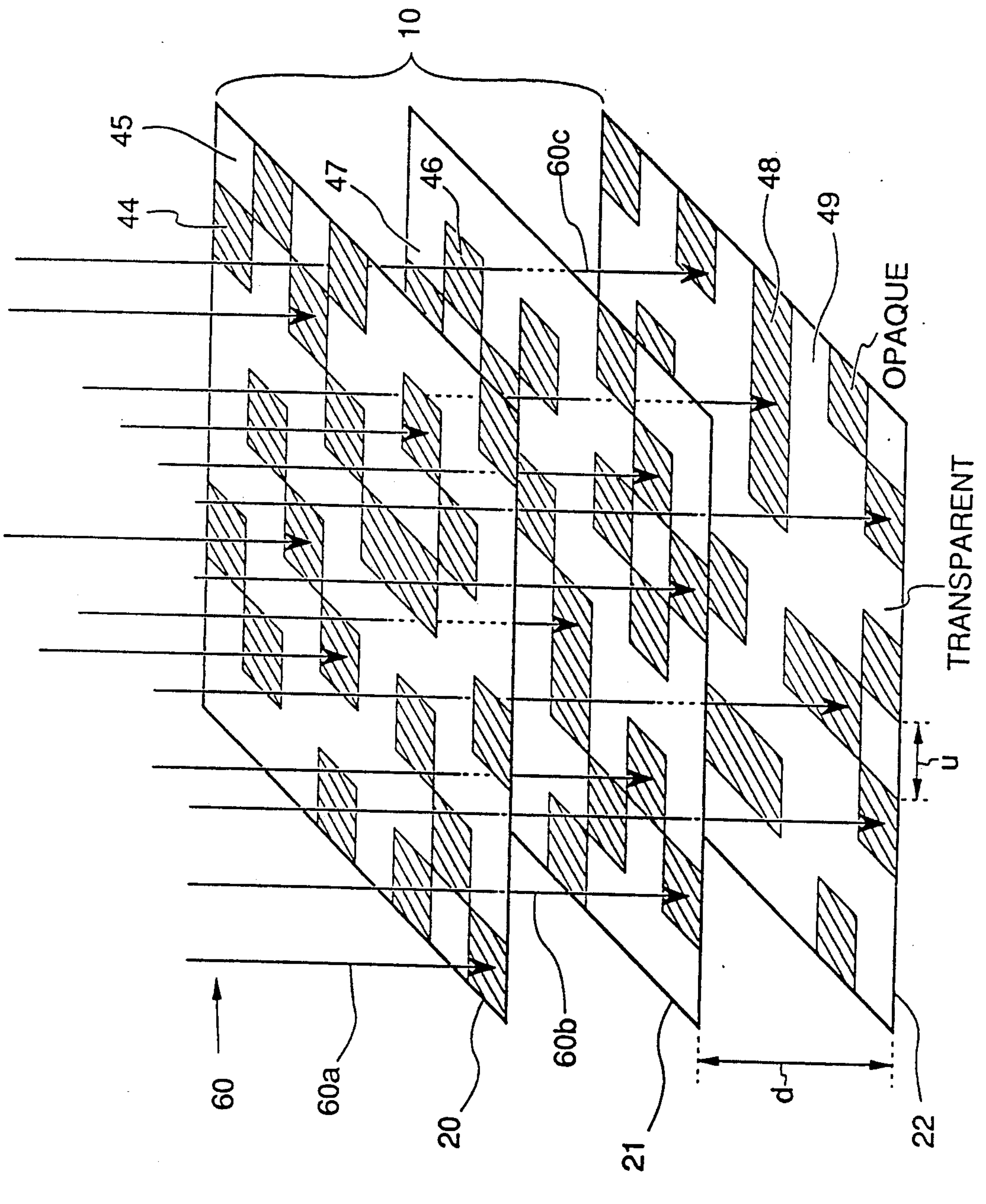
FIG. 5 is a schematic of a simple directional particle filter including three parallel planes, each having opaque and transparent units; the filter is designed to block all particles approaching perpendicular to the filter.

FIG. 5 shows a three-surface, one-blocking-point, opaque/transparent filter that blocks all particles approaching perpendicular to the filter. The filter 10 includes three parallel planar surfaces 20, 21, 22. Each of the three surfaces 20, 21, 22 is composed of one third by area opaque units 44, 46, 48 and two thirds by area transparent units 45, 47, 49. The opaque units 44, 46, 48 and transparent units 45, 47, 49 are arranged so that any path perpendicular to the filter 10 passes through one and only one opaque unit 44, 46, 48. Thus, some particles 60*a* approaching the filter 10 along a perpendicular path are absorbed by an opaque unit 44 on the first surface 20, some particles 60*b* approaching along a perpendicular path are passed by a transparent unit 45 on the first surface 20 and blocked by an opaque unit 46 on the second surface 21, and the rest of the particles 60*c* approaching along a perpendicular path are passed by a transparent unit 45 on the first surface 20 and a transparent unit 47 on the second surface 21 and absorbed by an opaque unit 48 on the third surface 22. No particles 60 approaching perpendicular to the filter 10 pass through any of the transparent units 49 on the third surface 22 to escape the filter.

Note that where a two-surface, one-blocked-point opaque/transparent filter has a highest possible background passing rate of 25%, this three-surface filter has a background passing ratio of 29.6% (since each surface passes $\frac{2}{3}$ of the incident particles the background passing ratio is $\frac{2}{3}\cdot\frac{2}{3}\cdot\frac{2}{3}$). Adding more surfaces increases the highest background passing ratio; an n-surface opaque/transparent filter can have a background passing ratio of $(1-1/n)^n$. This leads to a theoretical highest background passing ratio of 1/l E=36.8% for a filter of this type with infinitely many surfaces (assuming a filter composed of perfectly transparent and opaque units.)

A FILTER HAVING TWO BLOCKED POINTS

Figure 6:
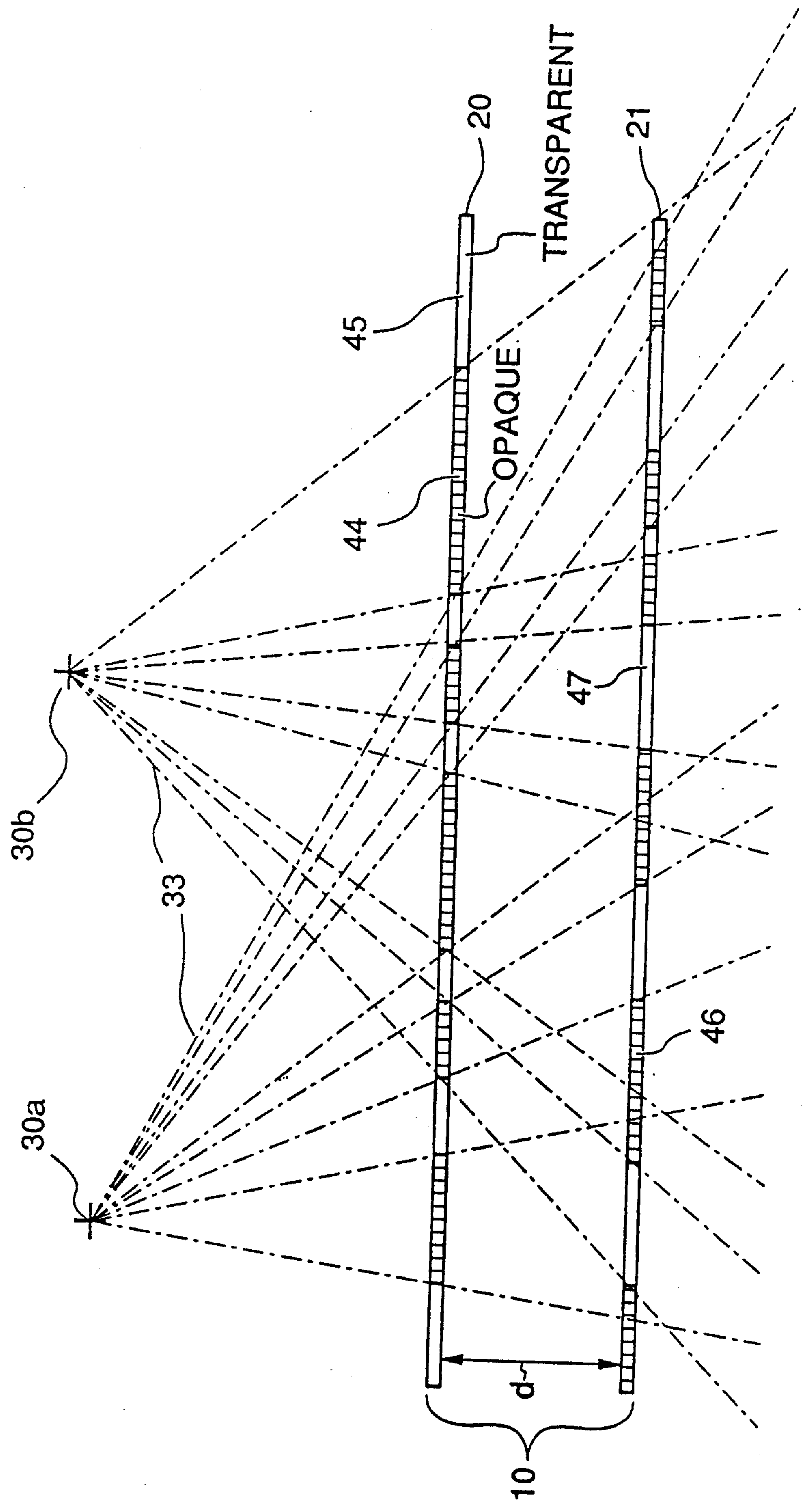
FIG. 6 is a schematic showing the process of arranging the opaque and transparent units of a two-plane filter having two blocked points.
Figure 7:
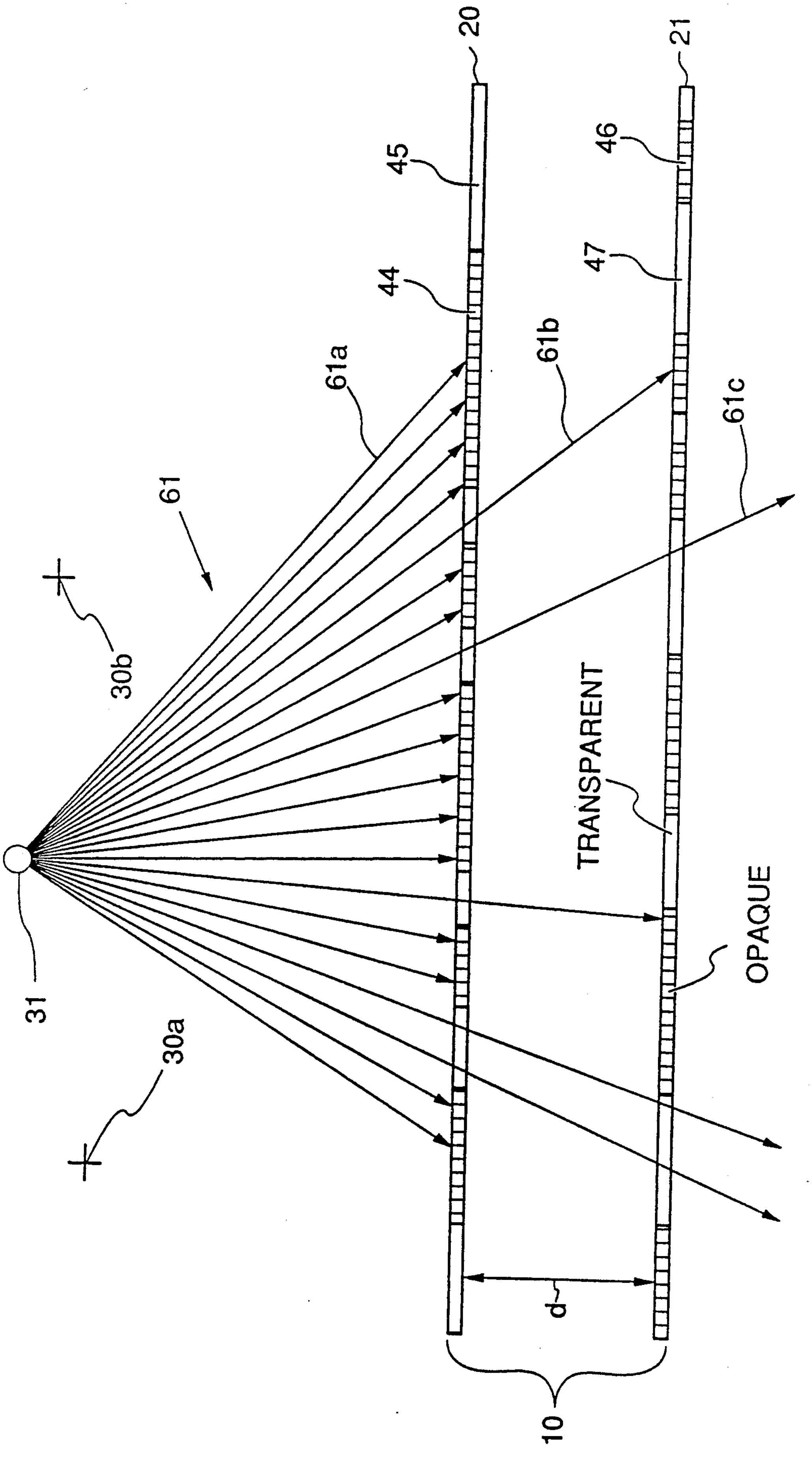
FIG. 7 is a schematic of the same filter shown in FIG. 6, showing the completed two-plane, two-blocked-point filter's effect on particles from a source distinct from the two blocked points used to arrange the units of the filter.

FIGS. 6 and 7 show schematics of the creation and use of a two-plane, opaque/transparent filter designed to block particles approaching from two separate blocked points. FIG. 6 shows the process of laying out opaque units 44, 46 and transparent units 45, 47 on the surfaces 20, 21 of the filter 10. First, opaque units 44 and transparent units 45 are randomly laid out on the first surface 20. Then, projection lines 33 are projected from the blocked points 30*a*, 30*b* through the units 44, 45 composing the first surface 20 to the second surface 21. Wherever a transparent unit 45 on the first surface 20 is projected onto the second surface 21, the second surface 21 must have an opaque unit 46, i.e., the opaque units 46 on the second surface 21 are the union of the images of the transparent units 45 on the first surface 20 as projected from the blocked points 30*a*, 30*b*. Thus, any particle from either of the blocked points 30*a* or 30*b* will either be blocked by an opaque unit 44 on the first surface 20 or passed by a transparent unit 45 on the first surface 20 and blocked by an opaque unit 46 on the second surface 21.

FIG. 7 shows the results when particles 61 from a particle source 31 sufficiently distant from either of the blocked points 30*a*, 30*b* strike such a filter 10. Some of the particles 61*a* are absorbed by opaque units 44 on the first surface 20, some of the particles 61*b* are passed by transparent units 45 on the first surface 20 and absorbed by opaque units 46 on the second surface 21, and some of the particles 61*c* are passed by transparent units 45 on the first surface 20 and transparent units 47 on the second surface 21 and thus pass through the filter 10.

Note that having two blocked points reduces the background passing ratio. If the first surface is 50% transparent, then each of the two projections will make 50% of the second surface's transparent units opaque; the second surface will be 25% transparent. This gives a background passing ratio of (50%·25%)=12.5%, half as good as for a one-blocked-point filter. Adding more points in this manner drastically decreases the background passing ratio; a five-source filter would have a background passing ratio of less than 1.6%. However, one can improve the filter by making the first surface more opaque than transparent. For a filter blocking n sources, the optimal first surface is $1/(n+1)$ transparent and $n/(n+1)$ opaque. This results in a surface that is $n^n/(n+1)^n$ transparent and gives the filter a background passing ratio of $n^n/(n+1)^{(n+1)}$. For one source, the background passing ratio is 25%, as expected. For two sources, the background passing ratio is 14.8%, for three sources 10.5%, and for five sources 6.7%—a large improvement.

A DIRECTIONAL FILTER USING LIQUID CRYSTAL CELLS

Figure 8:
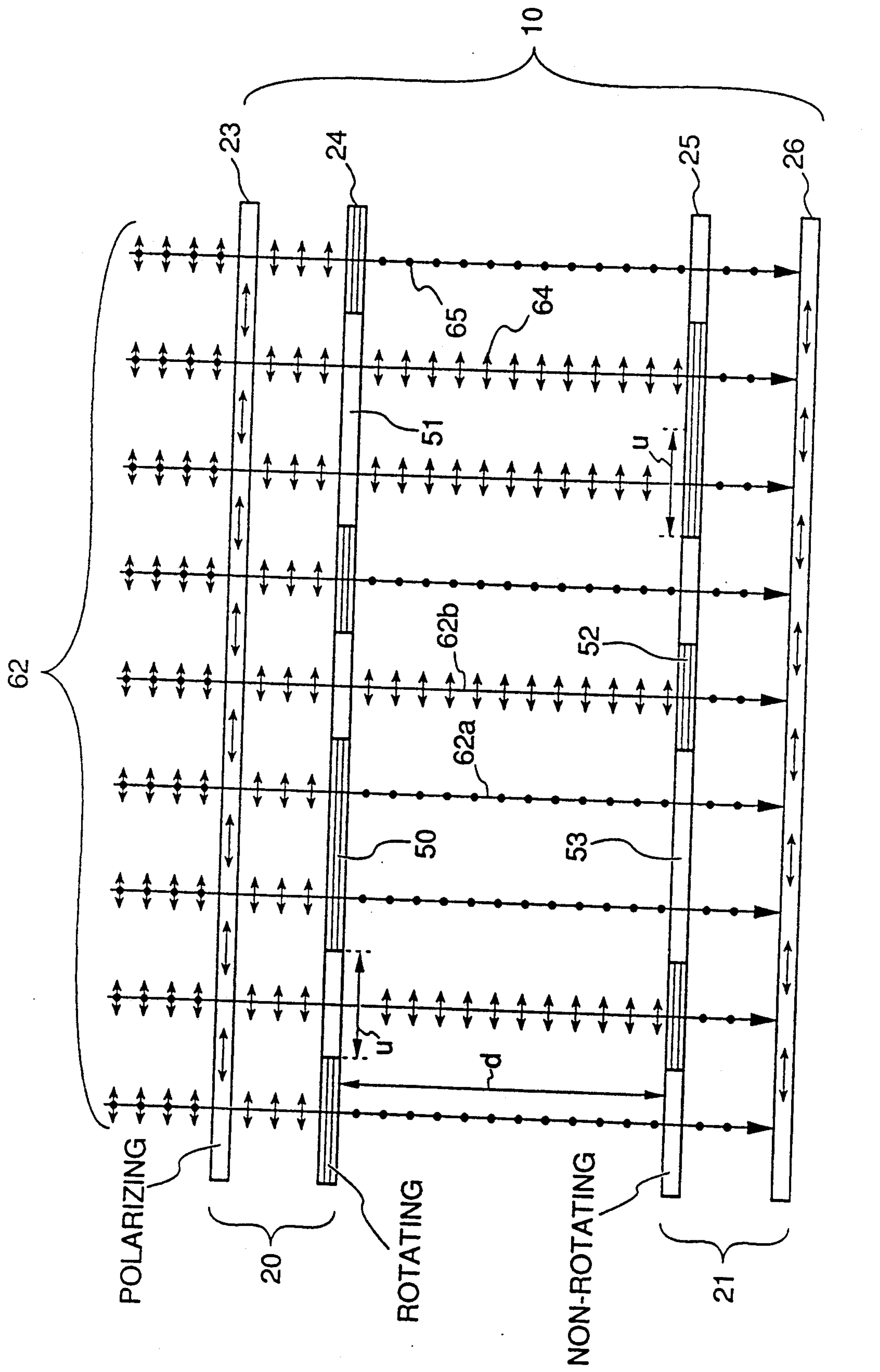
FIG. 8 is a schematic of an embodiment of a light filter including two parallel planes, each plane having a polarizing surface and a liquid-crystal cell. The filter is shown blocking all light approaching perpendicular to the filter.
Figure 9:
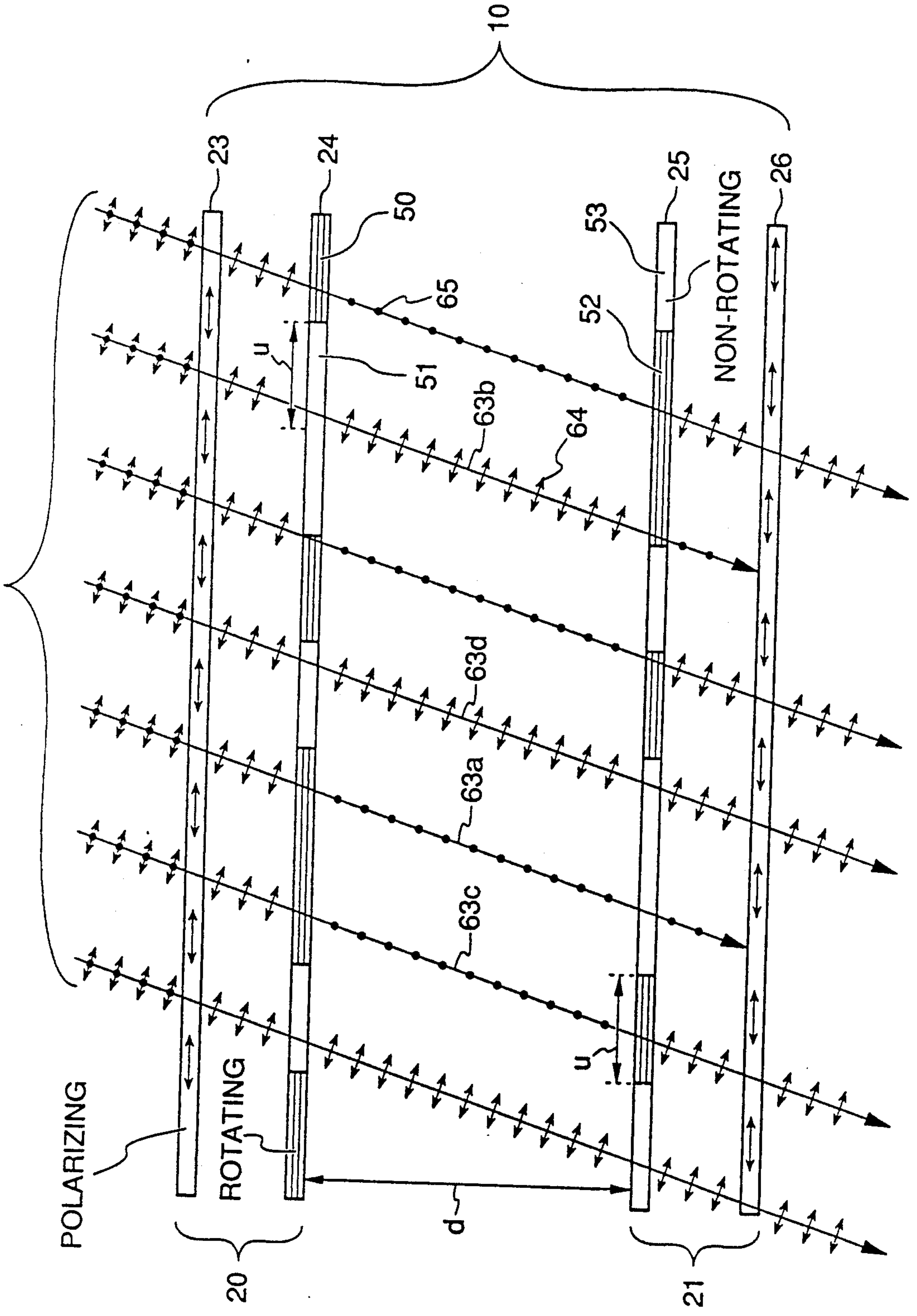
FIG. 9 is a schematic of the same filter shown in FIG. 8; the filter is shown passing some of the light approaching oblique to the filter.

In FIGS. 8 and 9, a two-plane filter using polarizing surfaces and liquid crystal cells is shown. The primary advantage of this embodiment derives from the fact that liquid crystal cells can be quickly and electrically switched from rotating to non-rotating. Using such liquid-crystal cells, one can construct a filter that without moving parts can selectively block a moving light source.

For the purpose of illustration, light polarization is indicated through the use of arrows superimposed on the light rays. Light polarized in the X direction (parallel to the page and perpendicular to the light rays) is shown by arrows 64 perpendicular to the light rays. Light polarized in the Z direction (perpendicular to both the page and the light rays) is shown by arrows coming out of the page; the arrows are drawn as circles 65 on the light rays. Unpolarized light, composed of both light polarized in the X direction and light polarized in the Z direction, is shown by both arrows 64 and circles 65.

The two surfaces 20, 21 of the filter 10 include polarizing surfaces 23, 26 and liquid crystal cells 24, 25. The polarizing surfaces 23, 26 only allow light polarized in the X direction to pass; they completely absorb light polarized in the Z direction and thus convert unpolarized light to light polarized in the X direction. The liquid crystal cells 24, 25 include rotating units 50, 52 and non-rotating units 51, 53. The rotating units 50, 52 convert light polarized in the Z direction to light polarized in the X direction, and light polarized in the X direction to light polarized in the Z direction. The non-rotating units 51, 53 pass all light unchanged. The liquid crystal surfaces 24, 25 are complements of each other; each rotating unit 50, 52 is aligned with a non-rotating unit 51, 53.

FIG. 8 shows light 62 perpendicular to the filter 10 being blocked. Half of the light 62*a* is polarized in the X axis by the first polarizing surface 23, rotated to light polarized in the Z axis by a rotating unit 50 in the first liquid crystal cell 24, passed unchanged by a non-rotating unit 53 in the second liquid crystal cell 25, and blocked by the second polarizing surface 26. The other half of the light 62*b* is polarized in the X axis by the first polarizing surface 23, passed unchanged by a non-rotating unit 51 in the first liquid crystal cell 24, rotated to light polarized in the Z axis by a rotating unit 52 in the second liquid crystal cell 25, and blocked by the second polarizing surface 26. Thus, no light 62 approaching perpendicular to the filter 10 is passed.

FIG. 9 shows light 63 approaching obliquely to the filter 10 being partially passed. One quarter of the light 63*a* is polarized in the X axis by the first polarizing surface 23, rotated to light polarized in the Z axis by a rotating unit 50 in the first liquid crystal cell 24, passed unchanged by a non-rotating unit 53 in the second liquid crystal cell 25, and blocked by the second polarizing surface 26. Another quarter of the light 63*b* is polarized in the X axis by the first polarizing surface 23, passed unchanged by a non-rotating unit 51 in the first liquid crystal cell 24, rotated to light polarized in the Z axis by a rotating unit 52 in the second liquid crystal cell 25, and blocked by the second polarizing surface 26. Another quarter of the light 63*c* is polarized in the X axis by the first polarizing surface 23, rotated to light polarized in the Z axis by a rotating unit 50 in the first liquid crystal cell 24, rotated back to light polarized in the X axis by a rotating unit 52 in the second liquid crystal cell 25, and passed by the second polarizing surface 26. The final quarter of the light 63*d* is polarized in the X axis by the first polarizing surface 23, passed unchanged by a non-rotating unit 51 in the first liquid crystal cell 24, passed unchanged by a non-rotating unit 53 in the second liquid crystal cell 25, and passed by the second polarizing surface 26. Thus, some light 63 approaching obliquely to the filter 10 is passed.

To calculate the background passing ratio, it can be seen that half of the possible tuples in FIG. 9 pass light, and half block light, giving an apparent background passing ratio of 50%: twice as good as the performance characteristic stated above. However, the tuples that pass light polarize the initially unpolarized light, attenuating it by 50% and giving the filter a true background passing ratio of 25%.

A PASSIVE AUTOMATICALLY-ADJUSTING LIGHT FILTER

The transparency of most materials is independent of the amount of light applied to the material. However, materials exist whose transparency is a function of the amount of incident light. One commercial example is the material used in the lenses of photochromic sunglasses; in low-light situations the lenses pass almost all incident light but when exposed to sunlight the lenses darken and absorb a larger proportion of incident light. Different photochromic materials are more or less responsive to the amount of light applied to them. Given a highly responsive photochromic surface and a single light source which is substantially brighter than the rest of the environment (e.g., the sun) one can construct a passive filter that automatically adjusts to block the source.

The filter includes two spaced parallel planes; the first plane is composed of equal areas of opaque and transparent units and the second is a highly responsive photochromic surface. A bright light source shining on the filter is blocked by the opaque units and passed by the transparent units on the first surface. The light passed by the transparent units strikes the photochromic surface, causing the illuminated areas to become opaque units; the shielded areas remain transparent units. This automatically creates the proper pattern of transparent and opaque units on the second surface, blocking light from the bright source while allowing light from other, weaker sources to pass. If the light source moves relative to the filter then the areas of light striking the second surface move, the opaque units adjust to block the new passed light, and the filter continues to block light from the bright source.

A SPHERICAL OR CYLINDRICAL FILTER

Figure 10:
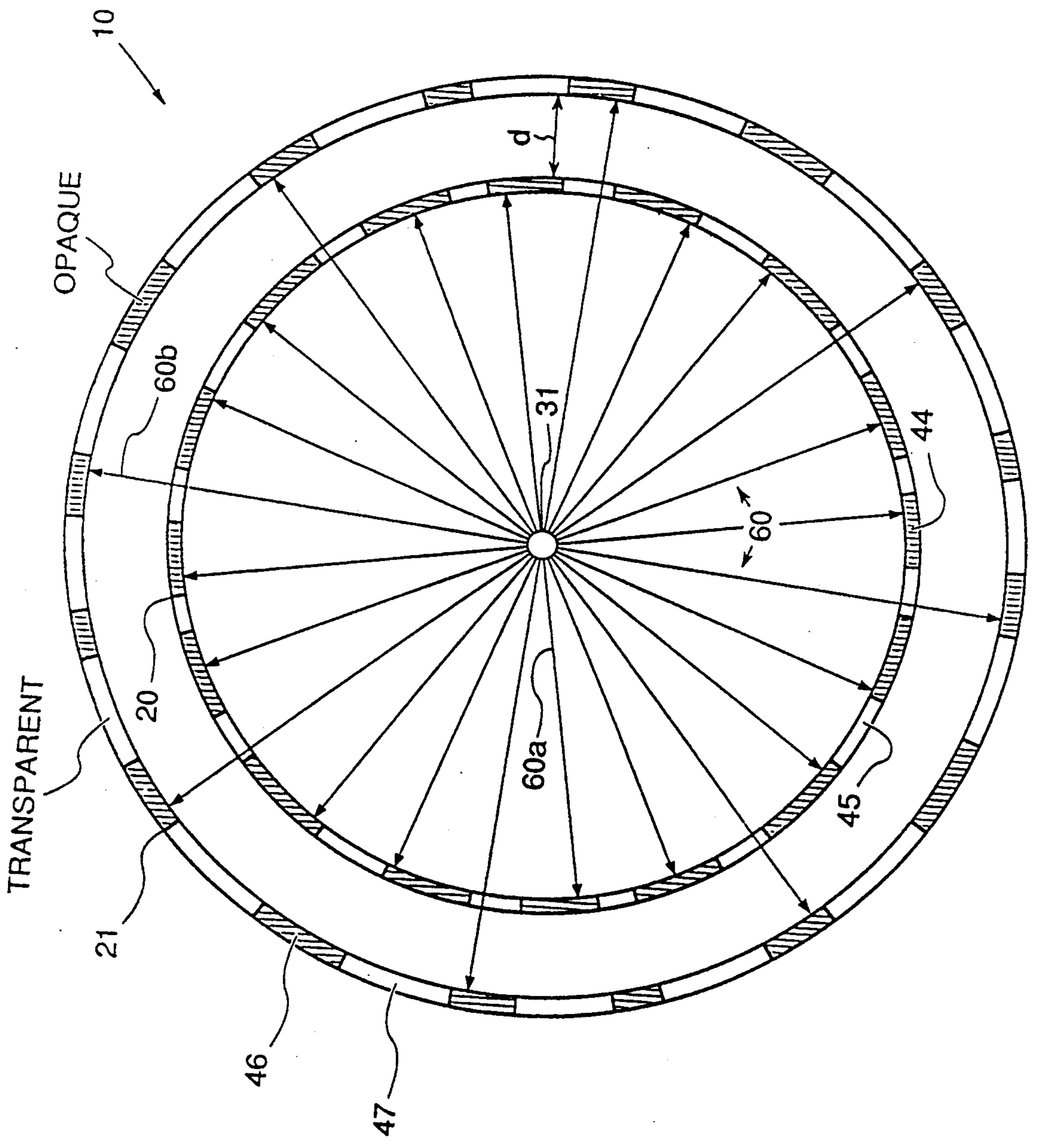
FIG. 10 is a schematic of an embodiment of a filter including two concentric spheres, each sphere having opaque and transparent units; the filter is shown blocking all particles from a single, central source.
Figure 11:
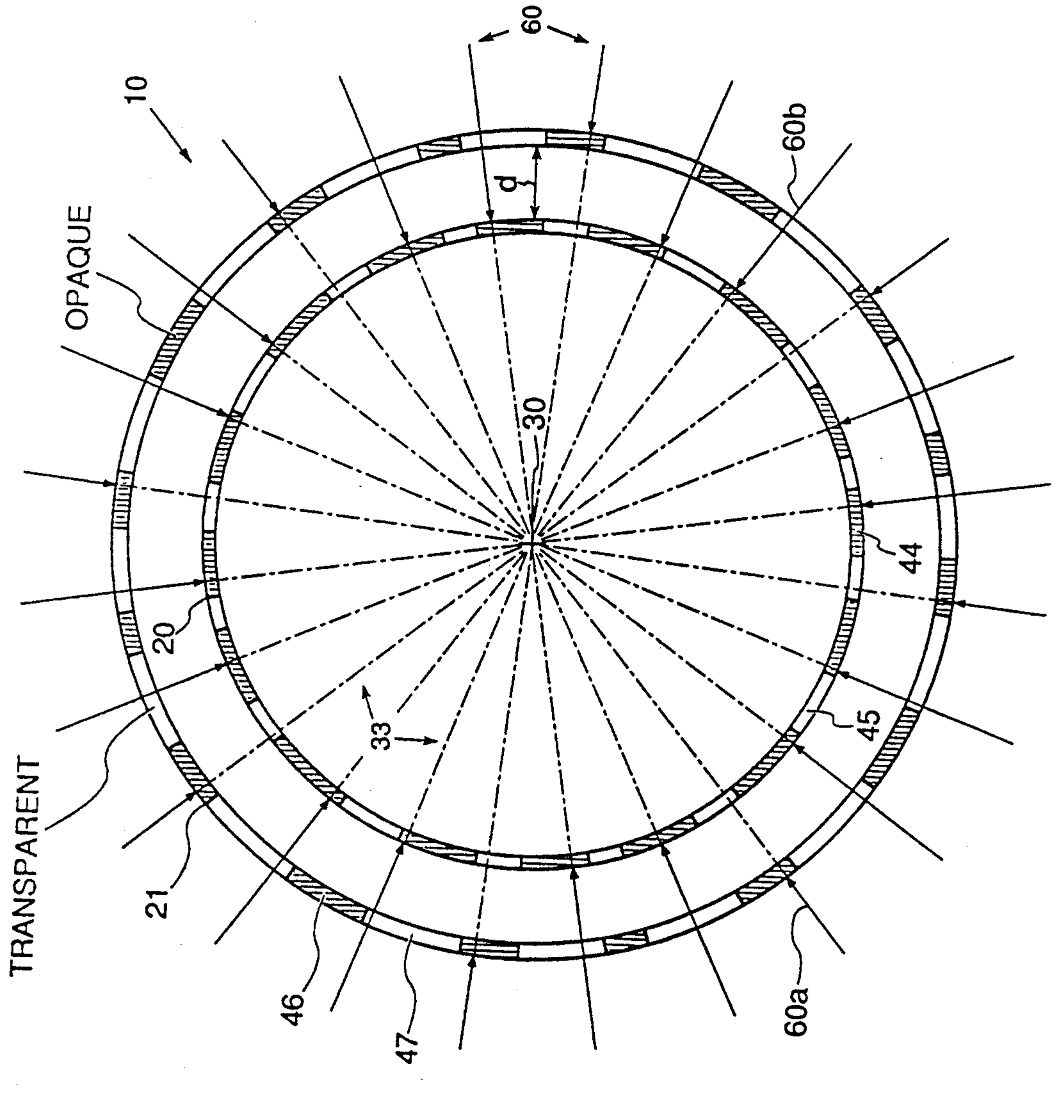
FIG. 11 is a schematic of the same filter shown in FIG. 10; the filter is shown blocking all particles whose projected paths intersect a central blocked point.

FIGS. 10 and 11 show a section through a two-surface opaque/transparent filter that includes two concentric spheres. Each sphere 20, 21 includes transparent units 45, 47 and opaque units 44, 46. The units are arranged by projection from a centrally located blocked point.

FIG. 10 shows the filter blocking all particles 60 emitted by a particle source 31 located at the blocked point. Half of the particles 60*a* emitted by the particle source 31 are blocked by the opaque units 44 of the inside surface 20, and half of the particles 60*b* emitted by the particle source 31 are passed by the transparent units 45 of the inside surface 20 and blocked by the opaque units 46 of the outside surface 21; no particles 60 emitted by the particle source 31 pass through both surfaces 20, 21 of the filter 10.

FIG. 11 shows the filter 10 blocking all particles 60 coming into the filter 10 whose projected paths intersect the blocked point 30. Half of the particles 60*a* are blocked by the opaque units 46 of the outside surface 21, and half of the particles 60*b* are passed by the transparent units 47 of the outside surface 21 and blocked by the opaque units 44 of the inside surface 20; no particles 60 pass through both surfaces 21, 20 of the filter 10 to reach the blocked point 30.

FIGS. 10 and 11 also serve to show a section through a two-surface opaque/transparent filter that includes two coaxial cylinders. Each cylinder 20, 21 includes transparent units 45, 47 and opaque units 44, 46 consisting of parallel regions extending the length of the cylinder. The units are arranged by projection from a centrally located blocked line.

FIG. 10 shows the filter blocking all particles 60 emitted by a linear particle source 31 located at the blocked line. Half of the particles 60*a* emitted by the particle source 31 are blocked by the opaque units 44 of the inside surface 20 and half of the particles 60*b* emitted by the particle source 31 are passed by the transparent units 45 of the inside surface 20 and blocked by the opaque units 46 of the outside surface 21; no particles 60 emitted by the particle source 31 pass through both surfaces 20, 21 of the filter 10.

FIG. 11 shows the filter 10 blocking all particles 60 coming into the filter 10 whose projected paths intersect the blocked line 30. Half of the particles 60*a* are blocked by the opaque units 46 of the outside surface 21, and half of the particles 60*b* are passed by the transparent units 47 of the outside surface 21 and blocked by the opaque units 44 of the inside surface 20; no particles 60 pass through both surfaces 21, 20 of the filter 10 to reach the blocked line 30.

A FILTER EMPLOYING MANY TYPES OF UNITS

The above embodiments employ two types of units on each surface. Filters that employ many types of units on each surface can also be built. One such embodiment includes two spaced parallel polarizing surfaces. The direction of polarization on each surface changes continuously from location to location. The polarization on the two surfaces is complementary: the polarizing action at any point of one surface is perpendicular to the polarizing action at the nearest point of the other surface. The final filter blocks all light approaching perpendicular to the filter.

To optimize the background passing ratio, the units' polarization directions should be as disparate as possible; the increased disparity between polarization increases the probability that randomly aligned light will pass through the filter. One can calculate the background passing ratio by averaging the passing ratios across all possible pairs of units, one from each surface. This is equivalent to averaging the passing ratios of two crossed polarizers across all possible angles between the polarizers' axis of polarization. The passing ratio of two crossed polarizers in series is the square of the sine of the angle between the polarizers' axis of polarization, all divided by two. Averaging this function for all possible angles gives us 0.25; the filter's background passing ratio is 25%.

AN INEXPENSIVE FIXED ONE-SOURCE FILTER

Figure 12:
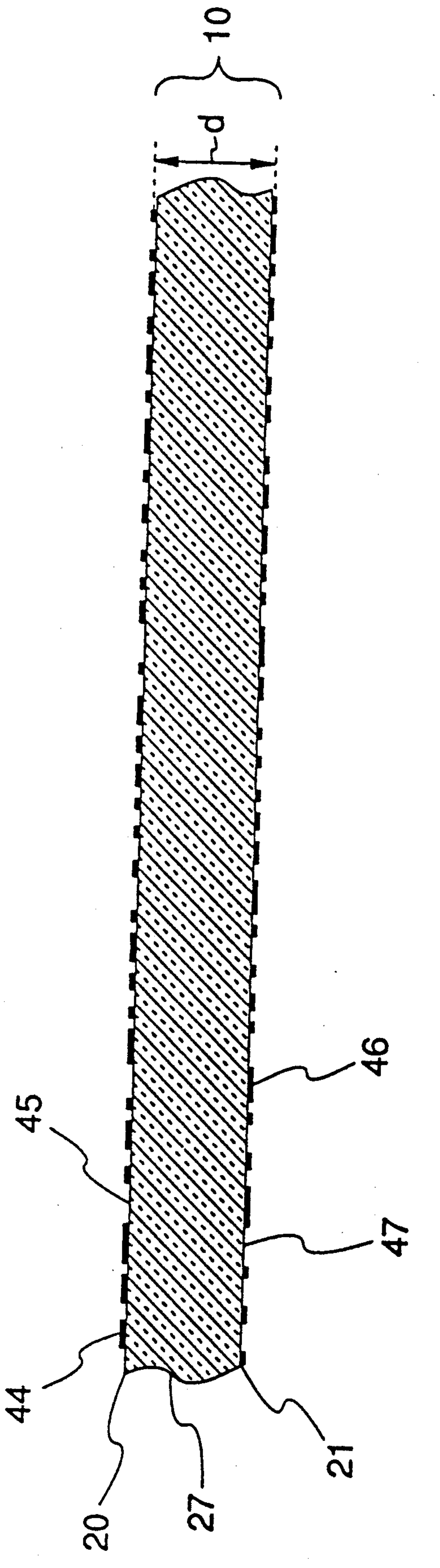
FIG. 12 is a cross-section of an inexpensive filter including a sheet of transparent material, each surface of the material having opaque and transparent units. The filter is designed to block all particles approaching from a given single, fixed source.

FIG. 12 shows an inexpensive filter, designed to block all light approaching perpendicular to the plane of the filter. The embodiment can be inexpensive and durable. It has many applications where particles from a fixed or slow-moving source need to be blocked, including car visors, beach umbrellas and window shades.

The filter 10 includes a substrate of transparent material 27; glass and acrylic are two possible materials. The two surfaces 20, 21 of the substrate 27 are composed of opaque units 44, 46 and transparent units 45, 47. The opaque units 44, 46 are composed of an opaque substance (e.g., ink) deposited onto the surfaces 20, 21 of the substrate 27; the transparent units 45, 47 are composed of areas lacking the opaque substance.

The above filter uses an opaque substance which completely blocks the passage of light. If a transparent red substance is used which passes red light but blocks blue light then a filter is formed which has no effect on red light but selectively filters blue light. This technique can be extended; a filter can be made which has a blocked light of one color at one location and a blocked point of another color at a second location.

A FILTER HAVING ONE BLOCKED LINE

Figure 13:
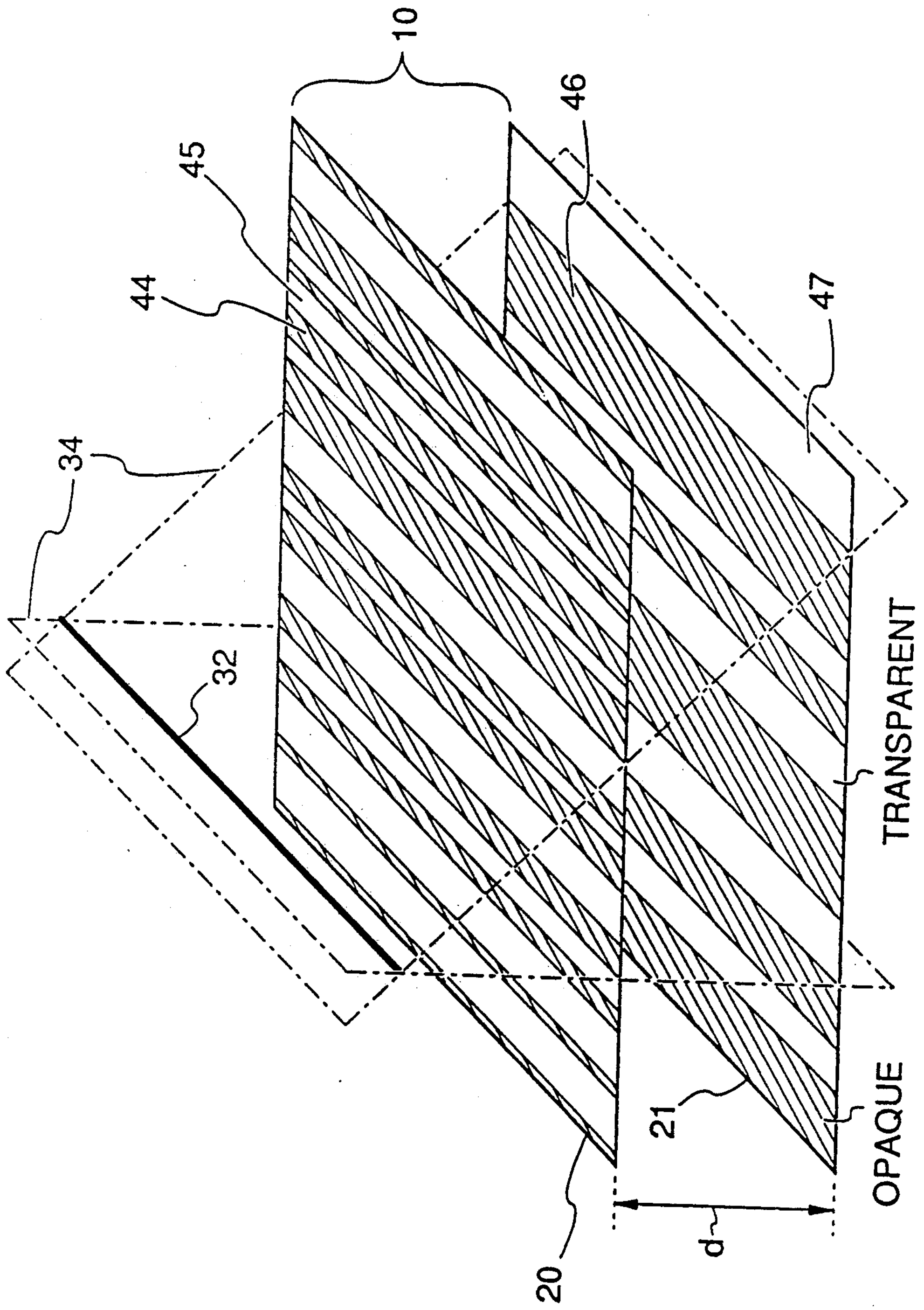
FIG. 13 is a schematic of a directional filter including two parallel planes, each having opaque and transparent units in the shape of bands of varying widths. The filter is designed to block all particles whose projected paths intersect a given single linear source.

FIG. 13 is a schematic of the use of projection in the construction of a filter designed to block all incident particles whose projected paths intersect a blocked line.

The filter 10 includes two plane surfaces 20, 21. The first surface 20 is composed of opaque 44 and transparent 45 units in the form of bands of variable width. Projection planes 34 are constructed from the blocked line 32 through the first surface 20 to the second surface 21. The projection planes project the transparent 45 and opaque 44 units of the first surface 20 onto the second surface 21. Wherever a transparent unit 45 is projected, an opaque unit 46 is placed on the second surface 21; wherever an opaque unit 44 is projected, a transparent unit 47 is placed on the second surface 21. Thus, any incident particle from the blocked line 32 will either be blocked by an opaque unit 44 on the first surface 20 or be passed by a transparent unit 45 on the first surface 20 and then blocked by an opaque unit 46 on the second unit 21.

Other embodiments are within the following claims.

What is claimed is:

1. A directional particle filter for selectively blocking specific particles whose projected paths intersect a predetermined point relative to the filter comprising a plurality of non-intersecting surfaces arranged in layers, each surface comprising multiple units, combinations of said units forming passing and blocking tuples, each tuple comprising one unit from each of said surfaces such that the projected path of any specific particle through the filter traverses a single tuple, all of said blocking and passing tuples being so arranged that the projected path of each specific particle through the filter that intersects said predetermined point relative to the filter traverses a blocking tuple, and the projected paths of specific particles through the filter that do not intersect said predetermined point traverse passing and blocking tuples, said units being further arranged such that no specific particle deflected by said units passes through said filter.

2. The directional filter of claim 1, wherein said blocking tuples selectively block specific electromagnetic particles.

3. The directional filter of claim 1, wherein said blocking tuples selectively block specific nuclear particles.

4. The directional filter of claim 1, wherein said units are transparent or opaque units.

5. The filter of claim 4, wherein said filter comprises three surfaces, each surface comprising a pattern of one-third opaque units and two-thirds transparent units.

6. The filter of claim 4, wherein particles whose projected paths intersect any of two predetermined points relative to the filter are selectively blocked.

7. The filter of claim 6, wherein said filter comprises two surfaces, said first surface comprising a pattern of one-third transparent units and two-thirds opaque units, and said second surface comprising four-ninths transparent units and five-ninths opaque units.

8. The directional filter of claim 1, wherein said filter comprises two surfaces.

9. The directional filter of claim 8, wherein said first surface comprises a first pattern of transparent and opaque units, and said second surface comprises a second pattern of transparent and opaque units complementary to said first pattern.

10. The filter of claim 9, wherein said first pattern is random and comprises an equal quantity of transparent and opaque units.

11. The filter of claim 9, wherein the flux through said filter of particles from a predetermined point relative to the filter is substantially greater than the flux through said filter of all other particles, and wherein said second surface comprises a photochromic material that automatically generates said opaque units in said second surface at all locations struck by particles from said predetermined point and remains transparent at all other locations.

12. The filter of claim 9, wherein said opaque units comprise areas on each face of a transparent substrate where an opaque material has been deposited and said transparent units comprise areas on said faces of said substrate devoid of said opaque material.

13. The filter of claim 12, wherein said opaque material is ink.

14. The filter of claim 12, wherein said complementary pattern on said second surface is created photographically.

15. The filter of claim 8, wherein said two surfaces are arranged in parallel to each other.

16. The filter of claim 15, wherein said two parallel surfaces can be translated laterally with respect to one another, whereby the predetermined point moves in a lateral direction relative to the filter.

17. The filter of claim 8, wherein said surfaces comprise polarizing surfaces and said units of a first surface each comprising a random direction of polarization.

18. The filter of claim 8, wherein each of said units comprises a polarizing surface and a liquid crystal cell arranged such that each of said projected paths sequentially intersects said polarizing surface and said liquid crystal cell of a unit in said first surface and said liquid crystal cell and said polarizing surface of a unit in said second surface.

19. The filter of claim 1, wherein particles whose projected paths intersect one predetermined point relative to the filter are selectively blocked.

20. The filter of claim 1, wherein said surfaces are concentric spheres and a predetermined point is within said concentric spheres.

21. The filter of claim 1, wherein said predetermined points comprise a line of points and said multiple units comprise bands.

22. The filter of claim 21, wherein said surfaces are concentric cylinders and said line of points lies within said concentric cylinders.

23. The filter of claim 1, comprising three surfaces comprising blocking tuples arranged to selectively block particles whose projected paths intersect any of a plurality of predetermined points.

24. A method of selectively blocking specific particles whose projected paths intersect a predetermined point relative to the filter comprising the steps of:

arranging a plurality of non-intersecting surfaces in layers to form a directional particle filter, each surface comprising multiple units such that combinations of said units form passing and blocking tuples, each tuple comprising one unit from each of said surfaces such that the projected path of any specific particle through the filter traverses a single tuple, arranging all of said blocking and passing tuples so that the projected path of each specific particle through the filter that intersects a predetermined point relative to the filter traverses a blocking tuple, and the projected paths of specific particles through the filter that do not intersect said predetermined point traverse passing and blocking tuples, further arranging said units such that no specific particle deflected by said units passes through said filter, and interposing said filter within the paths of particles including specific particles whose projected paths intersect a predetermined point relative to the filter to selectively block said specific particles.

25. A method of constructing a directional particle filter for selectively blocking specific particles whose projected paths intersect a predetermined point relative to the filter comprising the steps of:

generating a first pattern of transparent and opaque units on a first surface;

projecting said transparent and opaque units of said first surface onto subsequent surfaces along the projected paths of the particles that intersect the predetermined point, said surfaces being arranged such that they do not intersect, generating subsequent patterns of transparent and opaque units on said subsequent surfaces corresponding to the projections of said units of said first surface, the projection of a transparent unit of said first surface defining an opaque unit of at least one of said subsequent surfaces.

26. The method of claim 25, wherein said first pattern is random and comprises an equal quantity of transparent and opaque units.

27. The method of claim 25, wherein two predetermined points are used to project said transparent and opaque units from said first surface onto said subsequent surfaces.

28. The method of claim 25, wherein said filter comprises two surfaces arranged in parallel to each other.

29. The method of claim 25, wherein said filter comprises two surfaces, said projected paths intersect a single predetermined point relative to the filter, and said subsequent pattern of units on said second surface is generated such that the projection of a transparent unit of said first surface defines an opaque unit of said second surface and the projection of an opaque unit of said first surface defines a transparent unit of said second surface.

* * * * *